United States Patent [19]

Nishihara et al.

[11] 4,045,767
[45] Aug. 30, 1977

[54] METHOD OF ULTRASONIC DATA COMMUNICATION AND APPARATUS FOR CARRYING OUT THE METHOD

[75] Inventors: Motohisa Nishihara; Tetsuo Ito, both of Hitachi, Japan

[73] Assignee: Hitachi, Ltd., Japan

[21] Appl. No.: 398,474

[22] Filed: Sept. 18, 1973

[30] Foreign Application Priority Data

Sept. 20, 1972 Japan .................................. 47-93622

[51] Int. Cl.² .......................... G01V 1/00; H04B 13/00; H04B 15/00
[52] U.S. Cl. .............................. 340/5 R; 340/171 PF; 324/77 E
[58] Field of Search ............... 340/5 R, 16 C, 171 PF; 324/77 E, 78 D

[56] References Cited

U.S. PATENT DOCUMENTS

| 2,982,852 | 5/1961 | Fano | 340/5 R |
|---|---|---|---|
| 3,069,657 | 12/1962 | Green, Jr. et al. | 340/5 R |
| 3,075,400 | 1/1963 | Carlson | 340/16 C |
| 3,289,152 | 11/1966 | McIlwraith et al. | 340/5 R |
| 3,330,909 | 7/1967 | Willson | 178/66 R |
| 3,336,571 | 8/1967 | Johnson et al. | 340/5 R |
| 3,469,189 | 9/1969 | Miller, Jr. | 340/5 R |
| 3,742,440 | 6/1973 | Ehrlich et al. | 340/5 R |

*Primary Examiner*—Maynard R. Wilbur
*Assistant Examiner*—T. M. Blum
*Attorney, Agent, or Firm*—Craig & Antonelli

[57] ABSTRACT

In an ultrasonic data communication system, each datum is represented by a specific ultrasonic wave signal composed of plural frequency components arranged according to a specific one of predetermined frequency permutations so that the data transmission time can be considerably reduced without the influence of reverberation.

9 Claims, 9 Drawing Figures

METHOD OF ULTRASONIC DATA COMMUNICATION AND APPARATUS FOR CARRYING OUT THE METHOD

The present invention relates to a method and an apparatus for transmitting and receiving data in ultrasonic signals, with which a plurality of data are coded to be transmitted.

In general, in a method of ultrasonic communication of coded data (information) a piece of information or data is represented by a signal having a specific frequency. In this case, however, the number of signals having different frequencies becomes enormous if a number of different data are to be transmitted. Therefore, there is used a communication system in which a piece of data is represented by a binary code having a plurality of bits. This system has, however, a drawback that the time required in data transmission becomes rather long in order to transmit the data without the reverberant effect of ultrasonic waves. In addition, the longer is the transmission time, the greater is the probability that the signals are disturbed by noise.

One object of the present invention, which has been made to eliminate the above drawback, is to provide an ultrasonic data communicating apparatus which can encode a number of different data into ultrasonic signals and rapidly transmit the coded signals.

Another object of the present invention is to provide an ultrasonic data communicating apparatus in which the time required for data transmission is shorter, as compared with the conventional system, so that adverse influences by noise are hardly exercised on the data communication system.

The feature of the present invention is the representation of each piece of data by an ultrasonic signal composed of plural frequencies arranged according to a specific one of predetermined frequency permutations of pre-selected frequencies.

In the following, the present invention will be described in comparison with the piror art, with the aid of the accompanying drawings, in which.

Figure 1:
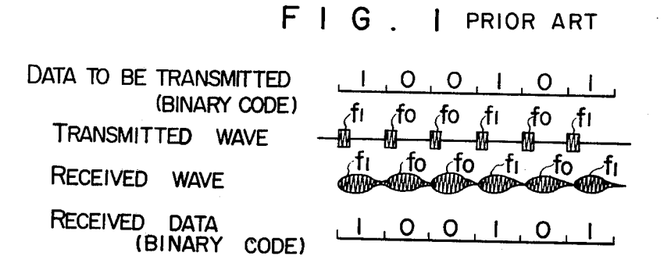
FIG. 1 shows waveforms useful to explain the conventional ultrasonic data communication system.

According to the conventional data communication system, for example, frequencies $f_1$ and $f_0$ are alloted respectively to the bits 1 and 0 of a piece of data to be transmitted, as shown in FIG. 1, and ultrasonic wave signals having frequencies $f_1$ and $f_0$ are emitted into the water at a constant period. The transmitted waves (ultrasonic signals) interfere with each other due to the reflections from the bottom and the surface of the water or the objects floating on in the water during propagation through the water, so that the reverberant effect occurs. Consequently, each ultrasonic signal representing a bit of a piece of coded data, received at the receiving end, has a trailing after-effect, as shown in FIG. 1. The received signal waves are separated in frequency into $f_1$ and $f_0$ to recover the original data. In this way, the transmission of data is performed. In this case, however, to eliminate the effect of reverberation, it is necessary to transmit each bit of ultrasonic signal after the trailing after-effect of the just previous ultrasonic signal has ceased. In this form of transmission, it will take a long time for all the data to be transmitted. The concrete description of the above statement is as follows. The reverberant time depends upon the transmission environment. Under circumstances where the reverberant time is about 80 ms for example, a time of about 100 ms is needed for transmission of each bit including a marginal time. Accordingly, in this case, it takes one second to completely cover a piece of data consisting of 10 bits. Thus, a considerable time is consumed in data transmission so that the resultant drawback is that the speed of data transmission is slow. Moreover, the greater is the amount of data the greater is the number of bits. If, therefore, the data increases, the transmission time increases, too. And the probability that the data suffer from noise is increased in proportion to the transmission time.

If a piece of data is represented by a permutation of $n$ frequency signals $f_1, f_2, \ldots, f_n$, then $n$ pieces of data can be represented by the whole permutation since the number of permutations of n different objects is $n!$, i.e. factorial of $n$. In this case, each permutation corresponds to the order of transmission. For example, signals of frequency $f_n, f_{n-1}, \ldots, f_2, f_1$ are sequentially transmitted in this order in the transmission of the piece of data represented by a frequency permutation of $f_n f_{n-1} \ldots f_2 f_1$. The $n!$ coded data are as follows:

$$
\begin{array}{llll}
f_1, & f_2, & \ldots \ldots \ldots \ldots \ldots, & f_{n-1}, \quad f_n \\
f_1, & f_2, & \ldots \ldots \ldots \ldots \ldots, & f_n, \quad f_{n-1} \\
\vdots & & & \\
f_n, & f_{n-1}, & \ldots \ldots \ldots \ldots \ldots, & f_2, \quad f_1
\end{array}
\tag{1}
$$

In the following, the present invention will be described as applied to the case where 24 data are transmitted which are encoded in accordance with the permutation of four different frequency signals $f_1, f_2, f_3$ and $f_4$.

Figure 2:
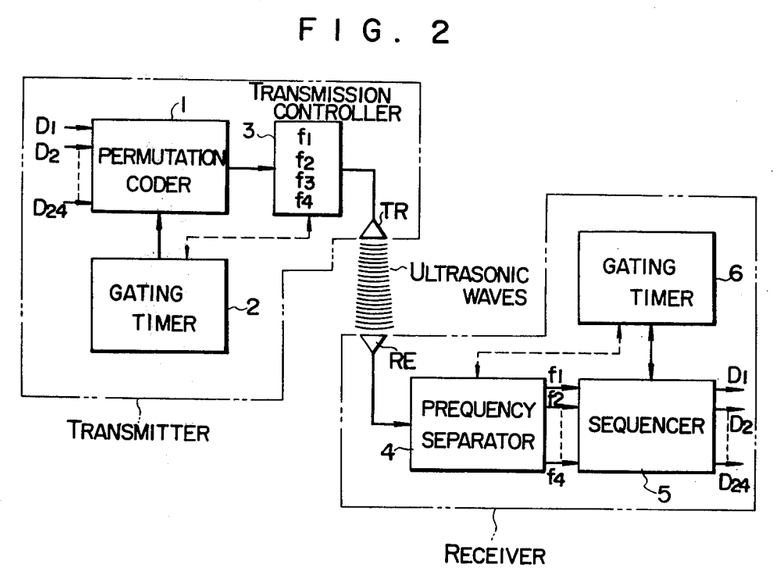
FIG. 2 is a block diagram of an ultrasonic data communication system as one embodiment of the present invention, including a transmitter and a receiver.
Figure 4:
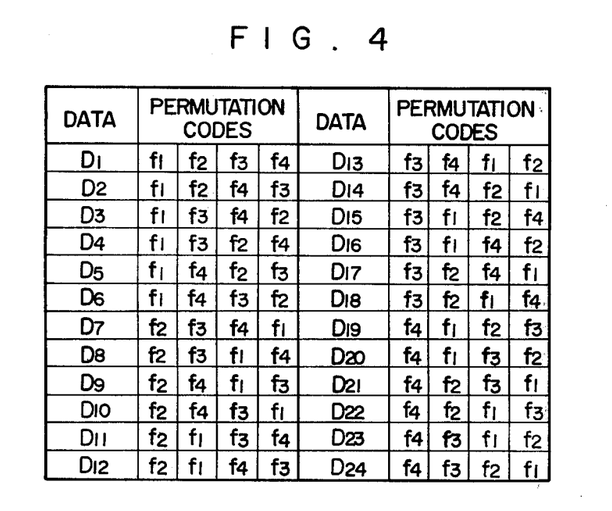
FIG. 4 tabulates, according to the present invention, exemplary data and the associated codes represented by the corresponding frequency permutations.

In FIG. 2, which shows an ultrasonic data communication system according to the present invention, a transmitter comprises a permutation coder 1, a gating timer 2, a transmission controller 3 and a wave sender TR, while a receiver consists of a frequency separator 4, a sequencer 5, a gating timer 6 and a wave catcher RE. $D_1, D_2, \ldots, D_{24}$ are twenty four data represented by the respective codes composed in accordance with the permutation of the frequency signals $f_1, f_2, f_3$ and $f_4$, as shown in FIG. 4.

The operation of the system shown in FIG. 2 will be described with the aid of FIG. 3. In case of transmitting data $D_3$, the data $D_3$ is fed to the permutation coder 1 to be converted into a permutation code $f_1f_3f_4f_2$ as shown in FIG. 4. After the frequency permutation code has been determined, the gating timer 2 delivers at a constant interval a series of gating signals. The gating signals actuate the transmission controller 3 in accordance with the frequency permutation code, and a frequency-modulated, ultrasonic wave signal is transmitted from the wave sender TR. The data $D_3$ is as shown in the diagram (a) of FIG. 3. The permutation code shown in the diagram (a) of FIG. 3 is frequency-modulated under the control of the gating signals shown in the diagram (b) of FIG. 3, delivered from the gating timer 2 before transmitted.

Figure 3:
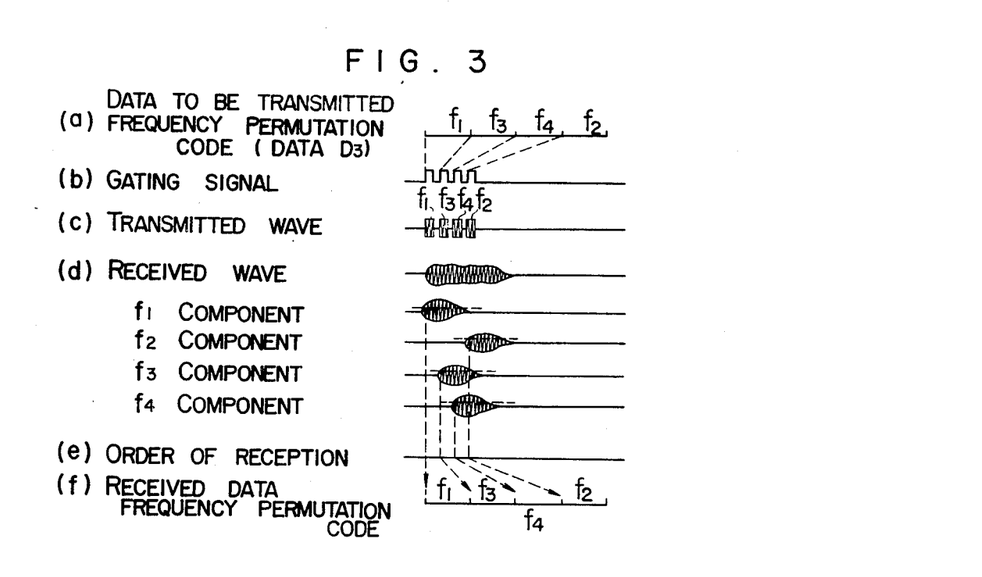
FIG. 3 shows waveforms useful for explaining the operation of the system shown in FIG. 2.

When the transmitted wave shown in the diagram (c) of FIG. 3 (ultrasonic wave signal) is received by the wave catcher RE, it is decomposed by means of the frequency separator 4 into $f_1, f_2, f_3$ and $f_4$ components and these components are brought to meet with the gating signals from the gating timer 6. The sequencer 5 detects the order of reception of the $f_1$ to $f_4$ components and the transmitted data is restored according to the result of the detection. As described above, each received signal has a trailing after-effect due to reverberation. According to the present method, however, the reverberant effect can be eliminated since the $f_1$ to $f_4$ components contained in the received signal are separated by the frequency separator 4 and the order of reception of the components is detected by the sequencer 5 so as to obtain a frequency permutation code.

Now, a concrete embodiment of the present invention will be described with the aid of FIGS. 5 and 6.

Figure 5:
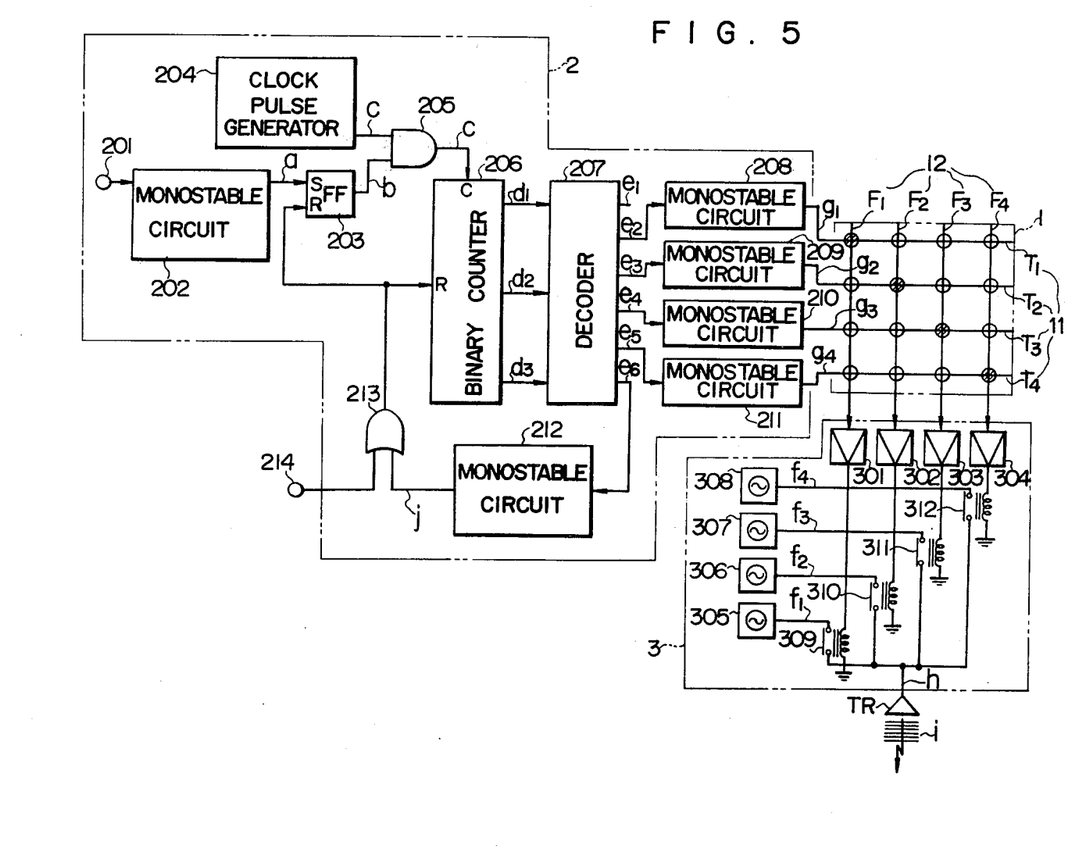
FIG. 5 shows a concrete consitution of a transmitter used in an ultrasonic data communication system according to the present invention.
Figure 7:
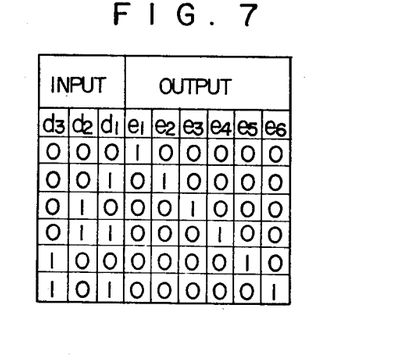
FIG. 7 is a table useful for explaining the operations of the decoders and the scale-of-two counters used in the circuits of FIGS. 5 and 6.

FIG. 5 shows a transmitter in a preferred embodiment of the present invention. In FIG. 5, a permutation line 11 consists of lines $T_1$ to $T_4$ and a frequency line 12 is constituted of lines $F_1$ to $F_4$, the permutation line 11 and the frequency line 12 being so arranged as to form a matrix to serve as a permutation coder 1. The frequency permutation codes as shown in FIG. 4 can be realized by joining the lines at cross points between one row and one column. A gating timer 2 comprises an input terminal 201 for trigger pulses; a monostable circuit 202; a flip-flop circuit 203 (hereafter referred to as an "FF circuit"); a clock pulse generator 204; an AND gate 205, a three-bit binary counter 206; a 3-line-to-6-line decoder 207 consisting of a logic circuit such as SN74156 manufactured by Texas Instruments Incorporated and an inverter circuit, which receives the outputs $d_1, d_2$ and $d_3$ of the binary counter 206 to deliver such logical outputs $e_1$ to $e_6$ as shown in FIG. 7; monostable circuits 208 to 212 triggered by the outputs $e_2$ to $e_6$ to deliver pulses $g_1$ to $g_4$ and j all having constant pulse durations, the pulses $g_1$ to $g_4$ being referred to as "time gate signals"; an OR gate 213; and a reset terminal 214. A transmission controller 3 comprises amplifiers 301 to 304; oscillators 305 to 308 generating signals having predetermined frequencies $f_1$ to $f_4$; and relay 309 to 312. And a wave sender TR is connected with the relays 309 to 312.

Figure 6:
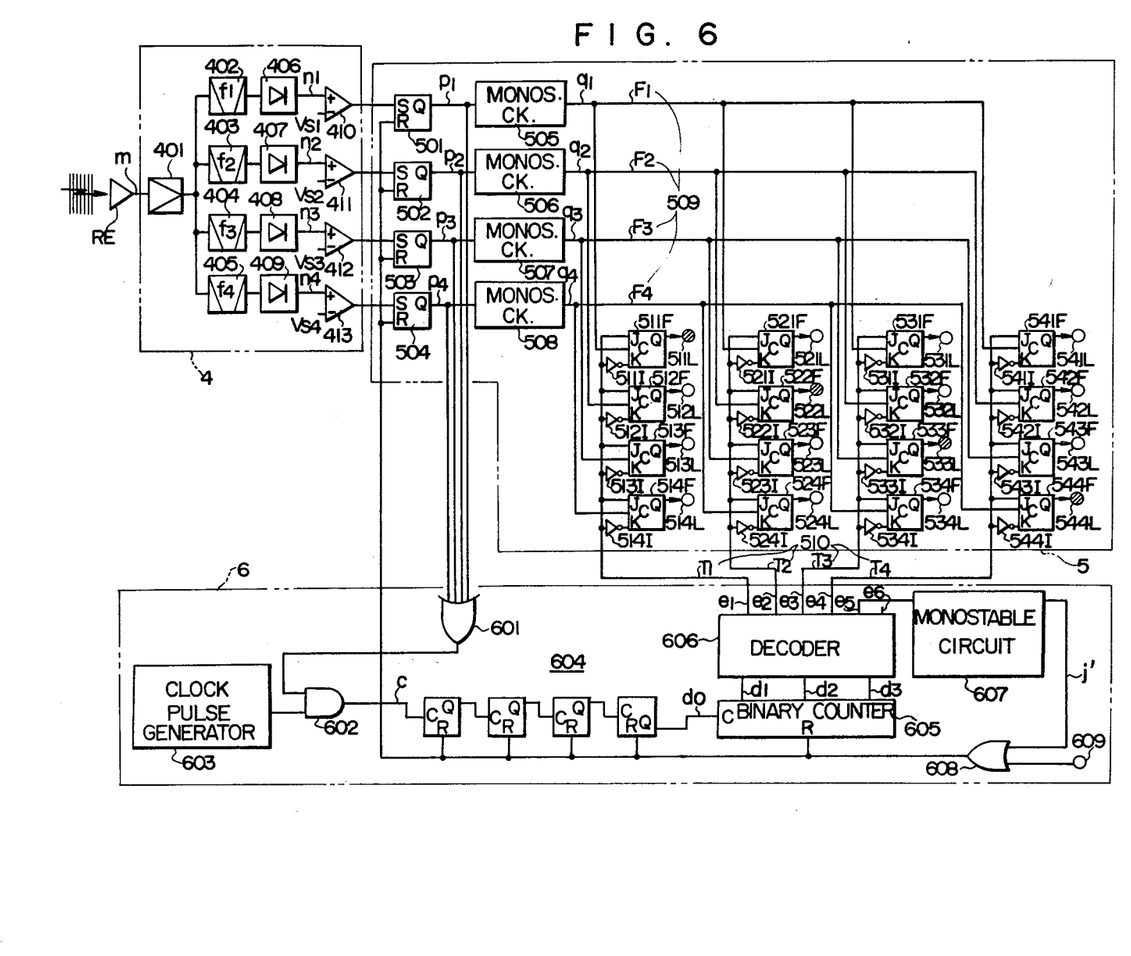
FIG. 6 shows a concrete constitution of a receiver used in an ultrasonic data communication system according to the present invention.

FIG. 6 shows a receiver in a preferred embodiment of the present invention, comprising a wave catcher RE, a frequency separator 4, a sequencer, 5 and a gating timer 6. The frequency separator 4 comprises an amplifier 401 to amplify the received signal m from the wave catcher RE; band-pass filters 402 to 405 to selectively pass the signals having predetermined frequencies $f_1$ to $f_4$; detectors 406 to 409; and level detecting circuits 410 to 413 to deliver outputs, that is, to detect the existance of signals, when the levels of the output signals $n_1$ to $n_4$ of the detectors 406 to 409 exceed the predetermined levels $V_{s1}$ to $V_{s4}$ (usually the levels $V_{s1}$ to $V_{s4}$ have the same value). The sequencer 5 comprises FF circuits 501 to 504; monostable circuits 505 to 508; a frequency line 509 consisting of lines $F_1$ to $F_4$; a permutation line 510 consisting of lines $T_1$ to $T_4$; master-slave J-K flip-flop circuits (hereafter referred to as "JK-FF circuits") 511F to 514F, 521F to 524F, 531F to 534F and 541F to 544F, the JK-FF circuits (for example, 7473 by Texas Instruments Incorporated) operating in such a manner that, for example, if the pulse $g_1$ on the line $F_1$ coincides in timing with the time gate signal $e_1$ on the line $T_1$, the JK-FF circuit 511F located at the cross point is triggered to deliver an output 1 at its terminal Q; inverters 511I to 514I, 521I to 524I, 531I to 534I and 541I to 544I; and indication lamps 511L to 514L, 521L to 524L, 531L to 534L and 541L to 544L, to indicate the outputs of the associated JK-FF circuits. The gating timer 6 comprises an OR gate 601; an AND gate 602; a clock pulse generator 603; a frequency divider 604 consisting of a plurality of FF circuits; a three-bit binary counter 605; a decoder 606; a monostable circuit 607; an OR gate 608; and a reset terminal 609. The binary counter 605 and the decoder 606 are the same as the binary counter 206 and the decoder 207 shown in FIG. 5, respectively. The outputs $e_1$ to $e_4$ of the decoder 606 are applied to the lines $T_1$ to $T_4$ of the permutation line 510 while the remaining output $e_5$ of the decoder 606 is fed to the monostable circuit 607.

The oscillating frequency of the clock pulse generator 603 is 16 times the oscillating frequency of the clock pulse generator 204 in the transmitter and the frequency of the generator 603 is reduced to 1/16 through the frequency divider 604, to be applied to the binary counter 605.

Figure 8:
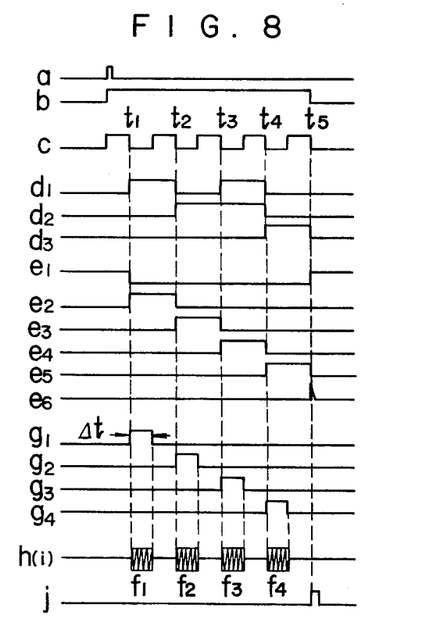
FIGS. 8 and 9 are time charts useful for explaining the operations of the transmitter and the receiver shown in FIGS. 5 and 6.
Figure 9:
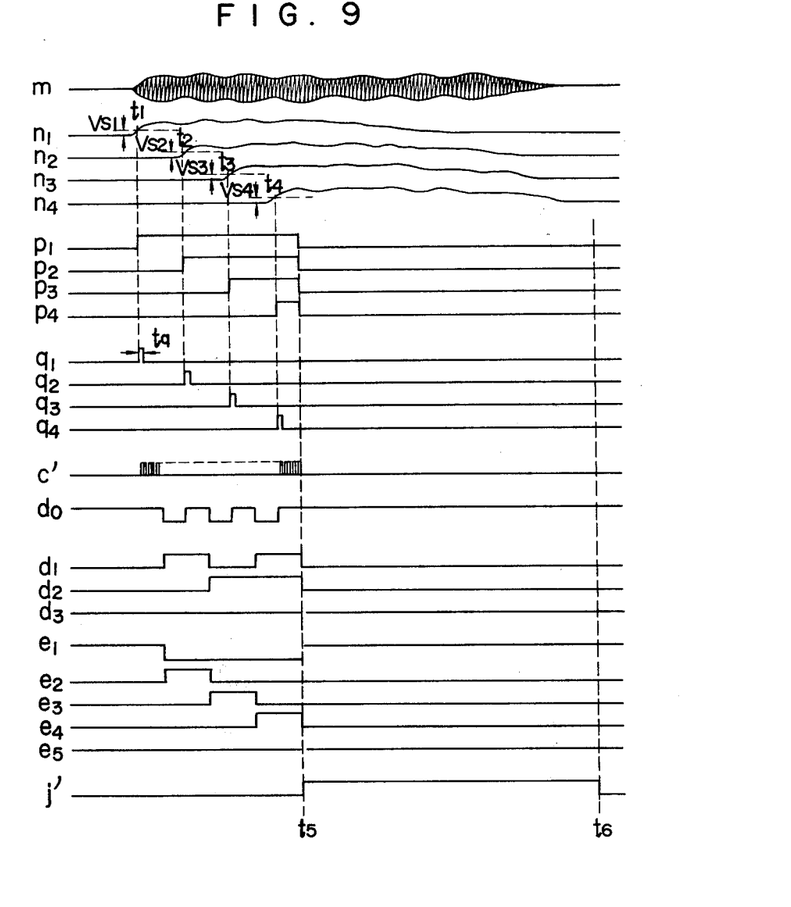

Next, the descriptions of the operations of the transmitter and the receiver shown in FIGS. 5 and 6 will be presented with the aid of the time charts shown in FIGS. 8 and 9.

Reference should first be had to FIGS. 5 and 8 showing the transmitter and the associated time chart.

The data to be transmitted are set in the permutation coder 1 according to the code table shown in FIG. 4. If, for example, the desired data is $D_1$, the corresponding frequency permutation code is $f_1f_2f_3f_4$, as shown in FIG. 4. Accordingly, the lines $F_1, F_2, F_3$ and $F_4$ of the frequency line 12 are joined respectively with the lines $T_1, T_2, T_3$ and $T_4$. A reset signal (pulse signal) is then applied to the reset terminal 214. And the FF circuit 203 and the binary counter 206 are cleared so that their outputs become 0. Consequently, the clock pulses C from the clock pulse generator 204 are blocked by the AND gate 205 so that the outputs of the decoder 207 are such that $e_1 = 1$ and $e_2$ to $e_6 = 0$. This is a stand-by or ready state. It is only at the initiation of the operation that the reset signal is applied to the reset terminal 214, but thereafter the output pulse j of the monostable circuit 212 is applied as a reset signal.

If a trigger pulse is applied to the input terminal 201 in such a stand-by state, the monostable circuit 202 delivers an output pulse a having a constant pulse duration to set the FF circuit 203. Then, the output b of the FF circuit 203 is 1 so that the clock pulses C from the clock pulse generator 204 pass through the AND gate 205 to be applied to the binary counter 206. The outputs $d_1, d_2$ and $d_3$ of the binary counter 206 vary at the instants of trailing edges (i.e., negative edges) of the clock pulses C so that the outputs $e_1$ to $e_6$ of the decoder 207 also vary at those instants. The outputs $e_2$ to $e_6$ of the decoder 207 are respectively converted through the monostable circuits 208 to 211 into time gate signals $g_1$ to $g_4$ having predetermined period of $\Delta t$, which signals are applied to the lines $T_1$ to $T_4$ of the permutation line 11. At the instant $t_1$, the time gate signal $g_1$ from the monostable circuit 208 is applied to the line $T_1$ of the permutation line 11. As the line $T_1$ has been joined with the line $F_1$ of the frequency line 12, the time gate signal $g_1$ is sent to the amplifier 301. The amplifier 301 amplifies the signal $g_1$ to such a level as to drive the relay 309 and the amplified signal turns the relay 309 on. Consequently, the signal $h$ having a frequency $f_1$ is sent from the oscillator 305 to the wave sender TR so that ultrasonic wave signal $i$ is transmitted. In like manner, ultrasonic wave signals having frequencies $f_2$, $f_3$ and $f_4$ and each having a duration of $\Delta t$, are emitted from the wave sender TR at instants $t_2$, $t_3$ and $t_4$ according to the time gate signals $g_2$ to $g_4$. The period of transmission of the ultrasonic wave signals having the freqencies $f_1$ to $f_4$ (time intervals between $t_1$ and $t_2$, $t_2$ and $t_3$, etc.) is determined by the period of the clock pulse signal C and therefore in connection with the time $\Delta t$. At the instant $t_5$, the output $e_6$ of the decoder 207 is $I$ and the monostable circuit 212 is triggered. The pulse output of the circuit 212 then clears the FF circuit 203 and the binary counter 206. Consequently, the clock pulses C are blocked by the AND gate 205 and the outputs $d_1$ to $d_3$ of the binary counter 206 are all returned to 0, so that the output $e_1$ of the decoder 207 is 1 while the remaining outputs $e_2$ to $e_6$ are 0. This is a stand-by state, and the stand-by state is kept until the next trigger pulse is applied to the input terminal 1.

Reference should secondly be made to FIG. 6 showing the receiver which receives such a transmitted ultrasonic wave signal as described above and reproduces the original data, and also to FIG. 9 showing the associated time chart. The operation of the receiver will be described with the aid of the time chart.

It is assumed that the wave catcher RE received an ultrasonic wave signal having a frequency permutation as shown in the diagram ($i$) of FIG. 8. As described before, the waveform of the received signal $m$ is somewhat distorted and has a trailing after-effect, due to reverberation. The received signal $m$ is decomposed through the band-pass filters 402 to 405 into components having frquencies $f_1$, $f_2$, $f_3$ and $f_4$, and the components are then detected through the detectors 406 to 409. At the instants $t_1$, $t_2$, $t_3$ and $t_4$ when the levels of the outputs $n_1$ to $n_4$ of the detectors 406 to 409 exceed the preset levels $V_{s1}$ to $V_{s4}$ of the level detectors 410 to 413, the FF circuits 501 to 504 are respectively set. During the rise times of the set outputs $P_1$ to $P_4$ of the FF circuits 501 to 504, the monostable circuits (MONOS. CK) 505 to 508 are triggered to obtain pulses $q_1$ to $q_4$ having a constant duration $t_q$. And the transmitted frequency permutation code can be detected by detecting the pulses $q_1$ to $q_4$.

At the instant $t_1$, the decoder 606 operates as if it were in the stand-by state and the output $e_1$ of the decoder 606 is 1. Accordingly, the inputs at the terminals K of the JK-FF circuits 511F to 514F are 0 while the inputs at the terminals J of the JK-FF circuits 511F to 514F are 1. Of these JK-FF circuits, the FF circuit 511F is triggered by the pulse $q_1$ to deliver an output 1 at its terminal Q. Therefore, the indication lamp 511L is lit.

On the other hand, the output pulse $p_1$ of the FF circuit 501 is applied through the OR gate 601 to the AND gate 602. Accordingly, the clock pulses C' from the clock pulse generator 603 is applied to the frequency divider 604 so that an output $d_o$ of the divider 604 has a frequency equal to 1/16 of the frequency of the clock pulse signal C'. The output $d_o$ is then applied to the binary counter 605, which counts at the trailing edges of the pulses contained in the output $d_o$ so that the outputs of the counter 605 vary as shown in FIG. 7 according to the counted contents. And in response to the outputs of the binary counter 605, the outputs $e_1$ to $e_6$ of the decoder 606 change also as shown in FIG. 7.

In this way, stand-by times are set for the respective lines (the FF circuits 511F to 514F, 521F to 524F, 531F to 534F and 541F to 544F) of the permutation line 510 according to the time gate signals $e_1$ to $e_4$ of the decoder 606. If one of the output pulses $q_1$ to $q_4$, say, pulse $q_1$ of the monostable circuit 505 is delivered and the line $T_1$ is in its standing-by state, then the FF circuit 511F is triggered to deliver an output 1 at its output terminal Q. In FIG. 6 is shown the case where the FF circuits 511F, 522F, 533F and 544F are triggered to light the indication lamps 511L, 522L, 533L and 544L. It is seen from these lamps that the transmitted datum has a permutation of $f_1f_2f_3f_4$ and the detum $D_1$ corresponding to the permutation code can be identified from the table in FIG. 4.

Thereafter, when the output $e_5$ of the decoder 606 is 1, the monostable circuit 607 is triggered to generate an output pulse $j^1$ having a constant duration. The output pulse $j^1$ is fed through the OR gate 608 to the FF circuits 501 to 504, the frequency divider 604 and the binary counter 605 so that they are reset to remain in the stand-by state until the next signal $m$ is received. The duration of the output pulse $j^1$ is so determined as to be long enough to eliminate the reverberant effect of the received wave $m$.

As described above, according to the present invention, signals having different frequencies, with one signal shifted in time by a slight interval (about 1/100 of the time of reverberation) from another, are coded according to the predetermined frequency permutations and transmitted so that the time required for data transmission can be considerably reduced without the influence of reverberation.

Moreover, according to the present invention, $n!$ different data can be coded by using n different frequencies and this is different from the conventional system wherein the number of data depends upon that of bits. Thus, the transmission time can be shortened. Namely, with the conventional system, 4096 data can be coded if 12 bits are used, but the transmission time increases in proportion to the number of bits used. On the other hand, according to the present invention, 7! (= 5040) data can be coded if seven different frequencies are employed and the transmission time can be reduced as compared with that required with the conventional system.

In the above described embodiments, the present invention is described as applied to the case where 24 data are transmitted by using four different frequencies $f_1$ to $f_4$. It is, however, apparent that the present invention can also be applied to the case where $n!$ data are coded and transmitted by using n different frequencies $f_1$ to $f_n$.

Further, according to the embodiment shown in FIG. 6, the received signal is frequency-separated and the sequence of the decomposed frequency components is detected in timing with the time gate signals obtained from the gating timer. At the receiving end, however, the order of reception of the frequency components can be detected without using the time gate signals. For example, a counter may be used for the purpose. Namely, the counter is started by the first received frequency component and the time difference between this component and another one to be next received, so that the order can be discriminated.

In addition, the receiver shown in FIG. 6 is so designed as to be operated in synchronism with the first received signal when the receiver is in its stand-by state. However, the beginning of each data can also be indicated by making the frequency of the first transmitted ultrasonic wave signal constant for the purpose of synchronism.

As described above, according to the present invention, each piece of data is represented by an ultrasonic signal composed of plural frequencies arranged according to a specific one of predetermined frequency permutations of pre-selected frequencies. Therefore, the data transmission time can be considerably reduced without the influence of reverberation and since the transmission time is shortened, the communication system is less liable to suffer from noise.

What we claim is:

1. An ultrasonic data communication system comprising:
   first means for generating at least three respectively different ultrasonic frequency signals;
   second means, coupled to said first means, selectively encoding information to be transmitted in accordance with any selected one of the permutations of the possible sequences of the frequencies of said at least three respectively different ultrasonic frequency signals;
   third means, coupled to said first means and said second means, for transmitting a selected permutation of said frequency signals, all of the frequency components of which define the information to be transmitted, by transmitting each frequency signal in its encoded order in the selected permutation for a prescribed period of time;
   fourth means, for receiving the frequency signals transmitted by said third means;
   fifth means, coupled to said fourth means, for separating the respective frequency signals making up the selected permutation received by said fourth means;
   sixth means, coupled to said fifth means, for detecting the frequency components in said separated frequency signals, and
   seventh means, coupled to said sixth means, for decoding said information in accordance with the order in which said frequency components have been detected by said sixth means.

2. An ultrasonic data communication system according to claim 1, wherein said second means comprises means for sequentially generating a plurality of pulses of a prescribed time duration and for gating each of said frequency signals to said third means in its order in said selected permutation for a period of time corresponding to a respective one of said pulses.

3. An ultrasonic data communication system according to claim 1, wherein said sixth means comprises means for generating a respective output signal upon the receipt of each separated frequency component, the duration of each output signal lasting only for a predetermined period of time.

4. An ultrasonic data communication system according to claim 2 where said sixth means comprises means for generating a respective output signal upon the receipt of each separated frequency component, the duration of each output signal lasting only for a predetermined period of time.

5. An ultrasonic data communication system according to claim 4, wherein said seventh means comprises a plurality of sets of flip-flop circuits, the number of flip-flop circuits in each set corresponding to the number of frequencies making up said plurality of frequency signals, respectively coupled to said respective output signal generating means, for providing respective outputs indicative of said selected frequency permutation and, accordingly, said information.

6. An ultrasonic data communication system in which each portion of the data to be transmitted is represented by a permutation of more than two predetermined ultrasonic frequency components whose frequencies are different from each other, said system comprising:
   first means for selecting any one of a plurality of permutations of more than two predetermined ultrasonic frequency components, whose frequencies are different from each other in accordance with the data to be transmitted;
   second means for generating time gate pulses at predetermined time intervals;
   third means for sending out an ultrasonic wave signal containing said ultrasonic frequency components spaced at the time intervals determined by said time gate pulses and in the order of said selected permutation;
   fourth means for receiving said ultrasonic wave signal;
   filter means for separating said received ultrasonic wave signal into said ultrasonic frequency components;
   fifth means for detecting said separated ultrasonic frequency components; and
   sixth means for detecting the order in which said separated ultrasonic frequency components have been detected by said fifth means and determining the permutation having been selected by said first means in accordance with said detected order.

7. An ultrasonic data communication system according to claim 6 in which said sixth means includes means for detecting the beginning of each of said separated frequency components to deliver a corresponding output, this detecting means being nonresponsive for a predetermined period of time after the delivery of said corresponding output.

8. An ultrasonic data communication system according to claim 7, in which said means for detecting said beginning comprises:
   a plurality of flip-flop circuits respectively provided for each of said separated frequency components, each of said flip-flop circuits being arranged so as to be set by a portion of the output of said separating means which portion contains the associated one of said separated frequency components; and
   means for detecting changes of the states of conduction of said flip-flop circuits.

9. A method of communication by way of ultrasonic data by making use of optionally selected ones of permutations each consisting of at least three different frequencies, comprising the steps of:

a. selectively encoding respective separate pieces of data to be transmitted in accordance with respective ones of the permutations of all the possible sequences of said at least three different frequencies, to thereby provide selected permutations corresponding to said pieces of data to be sent out;

b. changing the frequency of an ultrasonic wave signal in accordance with each respective sequence determined by each respective selected permutation;

c. sending out said ultrasonic wave signal;

d. receiving said ultrasonic wave signal;

e. separating said received ultrasonic wave signal into said frequency components;

f. detecting said separated frequency components and determining the order in which said frequency components were sent out; and g. recovering the sent out respective pieces of data from said detected frequency components making up the respective received permutations.

* * * * *